April 18, 1933. K. KARNATH 1,904,467
VALVE
Filed Sept. 21, 1929 4 Sheets-Sheet 3
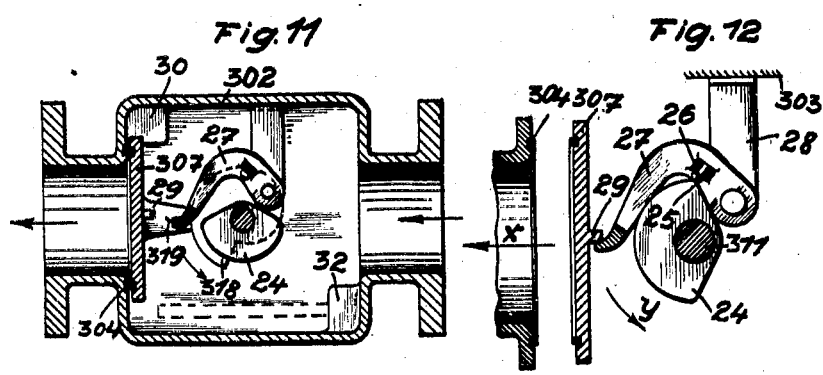
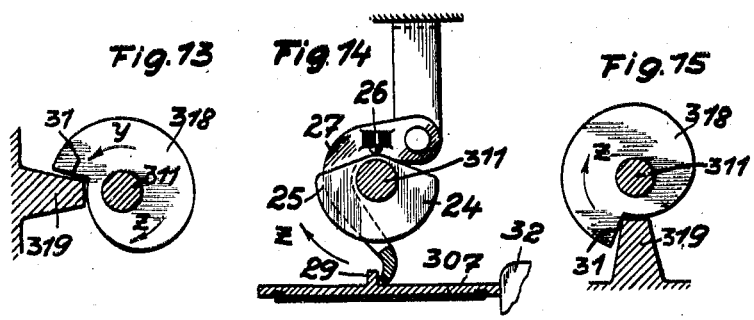
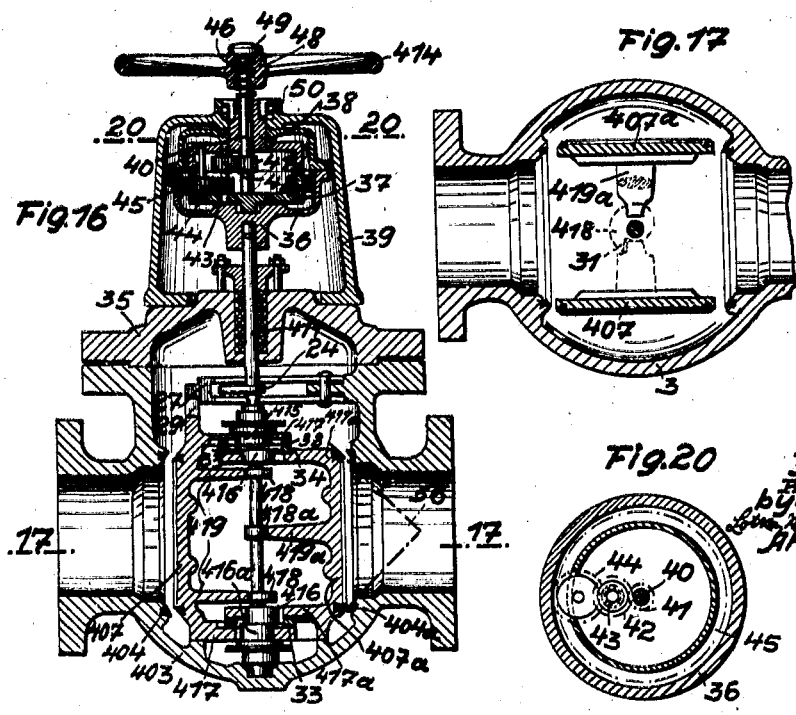

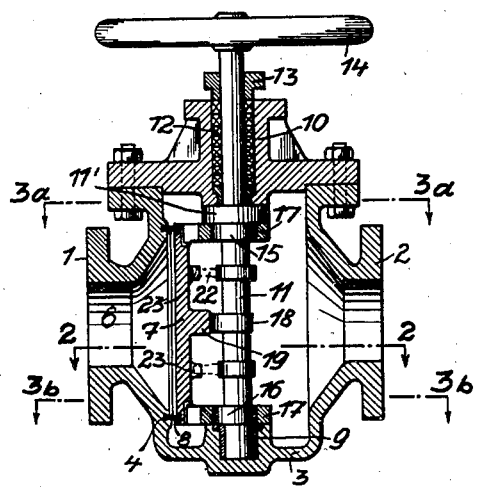

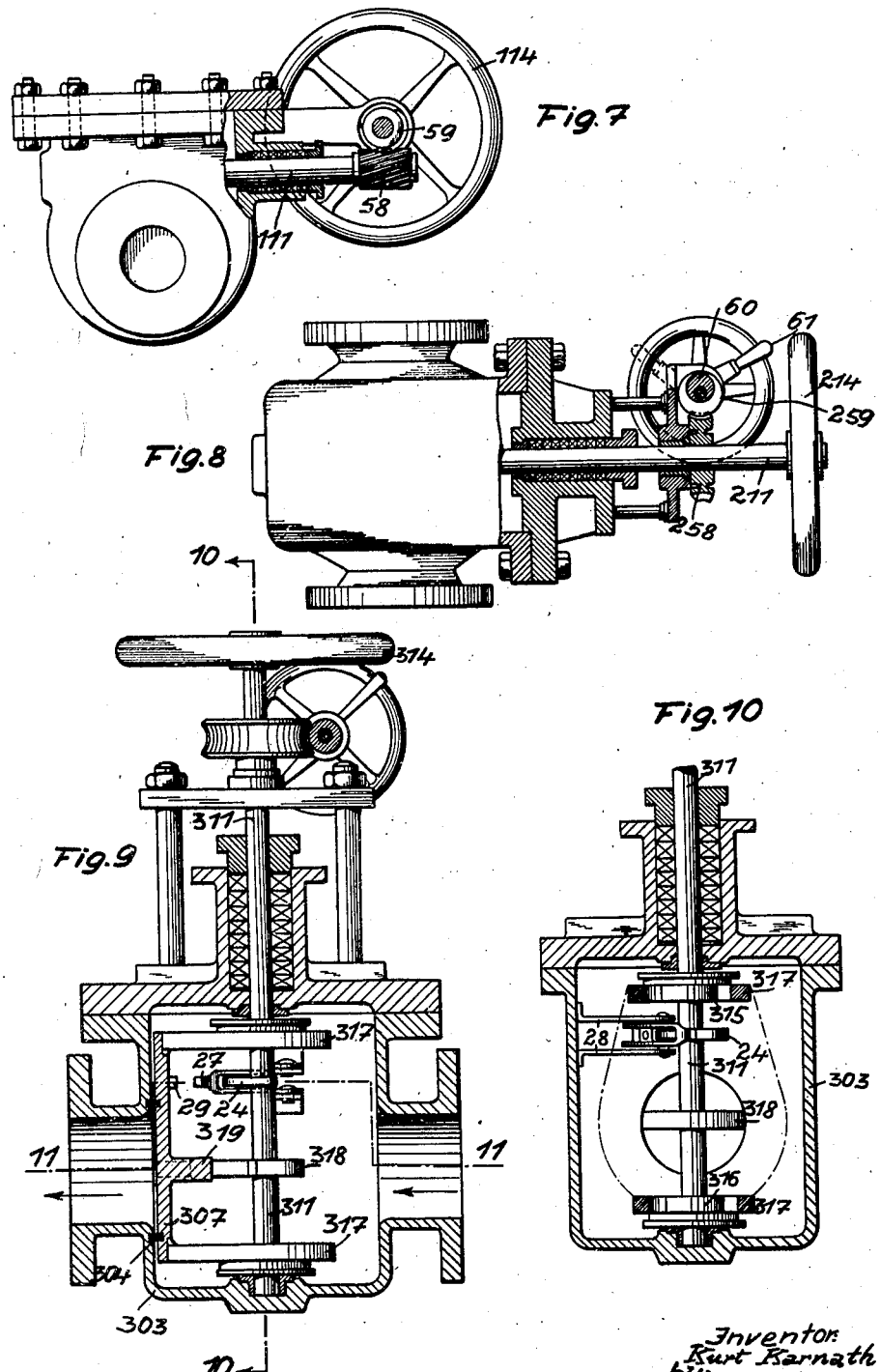

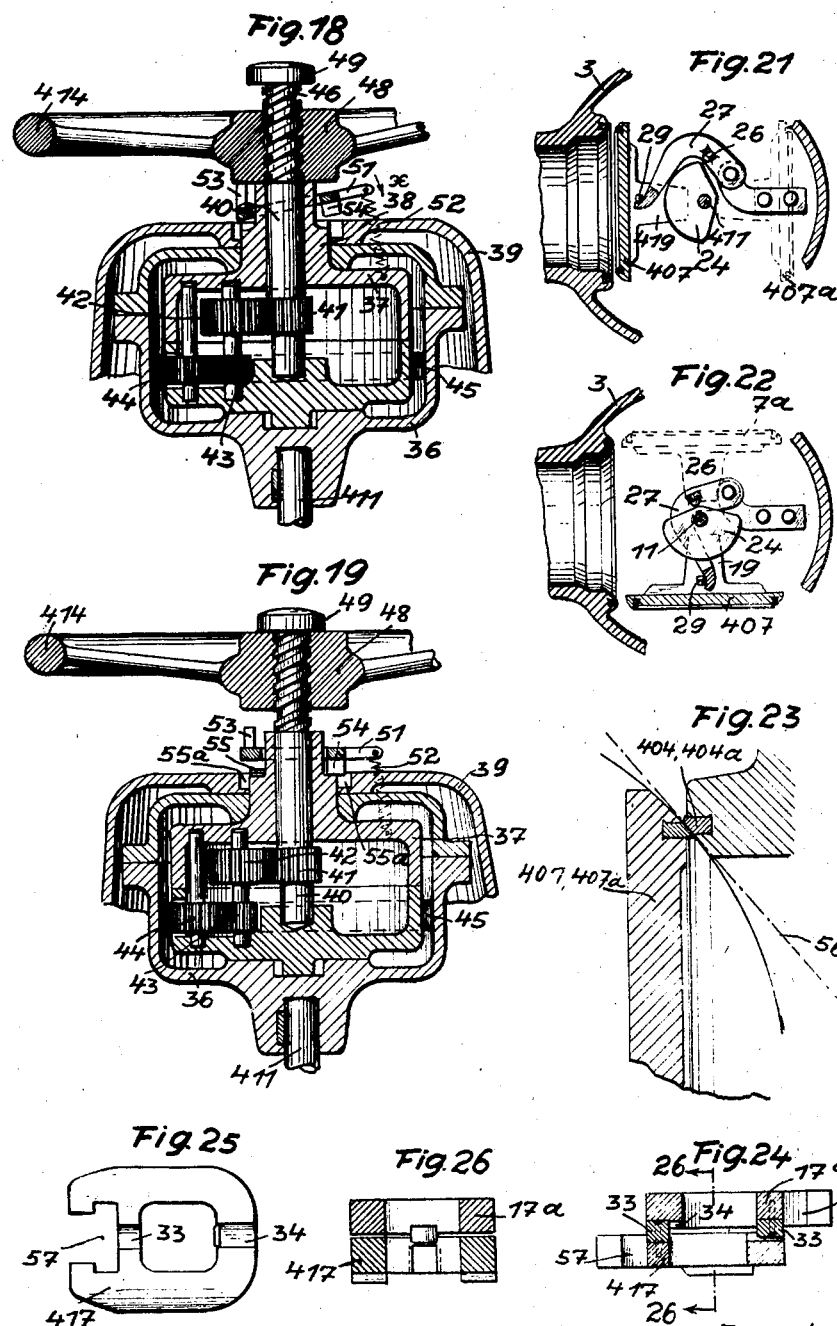

Patented Apr. 18, 1933

1,904,467

UNITED STATES PATENT OFFICE

KURT KARNATH, OF ZWEIBRUCKEN, GERMANY

VALVE

Application filed September 21, 1929, Serial No. 394,174, and in Germany October 2, 1928.

My invention relates to improvements in valves, and more particularly in valves for high pressure conduits in which by reason of the sudden change of the temperature the walls of the conduits are subject to high strain when rapidly opening the valves. One of the objects of the improvements is to provide a valve gearing for a rotary valve stem which is constructed for slowly operating the valve, and which can be thrown out of operation for rapidly operating the valve in case of danger. Other objects of the improvements will appear from the following description.

For the purpose of explaining the invention several examples embodying the same have been shown in the accompanying drawings in which the same reference characters have been used in all the views to indicate corresponding parts. In said drawings, Fig. 1 is a sectional elevation showing the valve, Fig. 2 is a sectional plan view taken on the line 2—2 of Fig. 1, Figs. 3a and 3b are sectional plan views on an enlarged scale and taken respectively on the lines 3a—3a and 3b—3b of Fig. 1, the said figures showing the cams provided on the valve stem and the eyes or bails cooperating therewith and provided on the valve disk, Fig. 4 is a sectional plan view on an enlarged scale showing a modification of the valve disk and its stem, Figs. 5 and 6 are respectively a sectional plan view and an elevation showing a valve disk, Fig. 7 is an elevation partly in section showing a valve casing and the valve gearing, Fig. 8 is an elevation partly in section showing a modification of the valve gearing, Fig. 9 is a sectional elevation showing another modification of the valve and its gearing, Fig. 10 is a sectional elevation taken on the line 10—10 of Fig. 9, the valve gearing being omitted, Fig. 11, is a sectional plan view taken on the line 11—11 of Fig. 9, Figs. 12 to 15 are detail views showing the operating mechanism for the valve disk in different positions, Fig. 16 is a sectional elevation showing a modification of the valve and its gearing, Fig. 17 is a sectional plan view taken on the line 17—17 of Fig. 16, Figs. 18 and 19 are sectional elevations showing the valve gearing of the valve illustrated in Fig. 16 on an enlarged scale, the gearing being shown in different positions, Fig. 20 is a sectional plan view taken on the line 20—20 of Fig. 16, Figs. 21 and 22 are detail views showing the apparatus for rocking the valve disk of the valve shown in Fig. 16 in different positions, Fig. 23 is a detail sectional view showing a part of the valve disk and the valve casing shown in Fig. 16, Fig. 24 is a sectional elevation showing a modification of the bail for operating the valve disk shown in Fig. 16, Fig. 25 is a top plan view of Fig. 24, and Fig. 26 is a sectional elevation taken on the line 26—26 of Fig. 24.

In the example shown in Figs. 1, 2, 3a and 3b the valve comprises a casing 3 provided with flanges 1 and 2 and provided internally with a ring 4 providing a seat for a valve disk 7, the diameter of the ring 4 being larger than that of the passage 6 of the valve casing.

The valve disk consists of a plate of yielding and elastic material, and it is equipped with a packing ring 8 fitting on the valve seat 4.

In a socket 9 provided at the bottom of the valve casing 3 and in a bore of the lid 10 of the valve casing a stem 11 is rotatable, which acts on the valve disk 7 for opening and closing the valve. The said stem is provided with a collar 11' preventing longitudinal displacement thereof. The lid 10 is provided with suitable packing rings 12 pressed into fluid-tight engagement with the wall of the bore of the lid 10 and the stem 11 by a gland 13.

To the top end of the stem 11 a hand wheel 14 is secured, and internally of the valve casing the stem carries cams 15 and 16 embraced by bails or eyes 17 secured to or made integral with the valve disk 7, for removing the valve disk from its seat when rotating the stem 11. As is shown in Figs. 3a and 3b the bails 17 are provided with finished faces 20 engaged by the cams 15 and 16. The said cams are different in form, the cam 16 extending through a greater part of the circumference of the stem 11. Thus, when rotating the stem 11 in the direction of the arrows shown in Figs. 3a and 3b for opening the valve at first the cam 16 engages the bail 17 cooperating therewith, and after turning the stem through an angle of about 90°, the cam 15 becomes operative. Therefore the valve disk is at first removed from its seat at one part of its circumference only, while the remaining part is still in engagement with the seat.

The valve disk shown in Figs. 5 and 6 is reinforced by ribs 70, and therefore it is not bent even in case of high fluid pressure and large diameter of the valve disk. But the valve disk can be bent by the cams 16 and 15 successively engaging the same in a direction transversely of the ribs. The ribs 70 end at points away from the margin 71 of the valve disk, which insures a fluid-tight joint because the valve disk is elastic at its margin and therefore follows any deformation of the valve casing 3 caused by high temperature.

To prevent the valve from being closed by the pressure of the valve disk on the cam members 15 and 16, the said cams are formed with portions 15a and 16a which are flat or have a very small pitch, the said portions 15a and 16a engaging the bails 17 when the valve disk has been removed from its seat. Between the cams 15 and 16 another cam 18 is fixed to the stem 11, which cam acts on a lug 19 projecting from the valve disk 7 when rotating the stem 11 in a direction for closing the valve, the said cam 18 pressing the valve disk 7 with its ring 8 into fluid-tight engagement with the seat 4.

Between the cams 15 and 16 and the cam 18 arms 22 are secured to the stem 11, and the said arms cooperate with lugs 23 provided on the valve disk, the angular position of the arms on the stem 11 being such that the arms engage the lugs 23 only after the valve disk 7 has been unseated. If therefore after opening the valve the stem 11 is further rotated the said arms 22 rock the valve disk 7 away from the passage 6 of the valve casing and into the position shown in Fig. 2 in dotted lines, the valve disk being guided in the meantime by the bails 17 engaging the cams 15 and 16, the collar 11' and the wall of the socket 9. For returning the disk 7 into position for closing the valve other arms are provided on the stem 11 which cooperate with suitable lugs made on the disk, the said arms and lugs being not shown in the figures. Additional stop members or the like for holding the valve disk in the rocked position shown in Fig. 2 in dotted lines and away from the passage 6 and for returning the disk 7 may be dispensed with if the cams 15, 16 and 18 are shaped so that they cooperate simultaneously with the bails 17 and the lug 19 when the valve disk has been unseated and the stem 11 is further rotated, as has been shown in Fig. 4. In this case the stem and the valve disk are coupled with each other so that the valve disk can be rocked away from the passage 6 and back again without providing additional stop members.

By constructing the valve in the manner shown in the figures the flow of the liquid through the valve finds comparatively low resistance. In the position shown in Figs. 1 and 2 in full lines the valve disk is disposed perpendicularly to the direction of the flow of the fluid through the valve, and after the valve disk has been rocked into the position shown in Fig. 2 in dotted lines the fluid flows through the valve casing in a rectilinear direction and without being deflected. Therefore the resistance opposed to the flow of the liquid is reduced to a minimum.

When opening the valve the stem 11 and the cams 15 and 16 are rotated by means of the wheel 14, and the cam 18 releases the lug 19 of the disk 7 while at one side of the circumference of the disk the lug 16 is already in position for acting on the bail 17, thus lifting the valve disk 7 at one end from the seat 4. Therefore the pressure on opposite sides of the valve disk is balanced more or less through the open portion of the valve, so that the power required for further unseating the valve disk is reduced. In the position shown in Fig. 2 in full lines the disk 7 has been removed from the seat 4, and the flat portions 15a and 16a of the cams 15 and 16 engage the bails 17, so that the valve disk is held in position notwithstanding the pressure acting thereon.

When closing the valve the disk is first rocked from the position shown in Fig. 2 in dotted lines into the position shown in full lines, and thereafter, upon further rotation of the stem 11, it is pressed on its seat 4 by means of the cam 18 acting on the lug 19.

In Figs. 7 and 8 I have shown gearing for operating the valve, and I wish it to be understood that similar gearing is preferably connected with the valve stem shown in Fig. 1. As is shown in Fig. 7 the valve stem 111 carries a worm gearing 58 engaged by a worm 59. Thus, any desired gear ratio may be provided between the hand wheel 114 and the stem 111. In the modification shown in Fig. 8 the stem 211 is likewise provided with a worm gearing 258, and the worm 259 and its shaft are mounted in an eccentric bearing block 60. Thus, by turning the bearing block 60 by means of a lever 61 fixed thereto the worm can be thrown out of engagement with the gear wheel 258. After thus retracting the worm from the worm gearing the stem 211 can be rapidly rotated by means of the hand wheel 214 as may be necessary for rapidly forcing the valve disk 7 on its seat 4. In Figs. 9 to 15 I have shown a modification in which a cam 24 is secured to the stem 311 between the cams 315 and 318, the cam 24 being in the form of a segment having a concentric portion extending substantially 180°. Thus at the part where the circumferential part of the cam merges into the radial portion thereof a shoulder 25 is provided, as is best shown in Fig. 12. The cam 24 is engaged by a lug 26 provided on a curved lever 27 rockingly mounted on a bracket 28 fixed to the inner wall of the valve casing 303, the free end of the said lever being adapted for engagement with a lug 29 provided on the valve disk 307. Otherwise the construction of the valve is similar to the construction shown in Fig. 1, and the same letters of reference have been used to indicate corresponding parts.

The operation of the valve shown in Figs. 9 to 15 is as follows:

For opening the valve the valve disk 307 is at first removed from the seat 304 by rotating the stem 311, the cams 315 and 316 acting on the bails 317. Thus the disk 307 is removed from the position shown in Fig. 11 into the position shown in Fig. 12, and it is guided by a rail 30 provided on the inner wall of the valve casing. After the valve disk 307 has been brought into the position shown in Fig. 12 the lug 29 is engaged by the outer end of the lever 27. The cam 318 which heretofore acted on the lug 319 for forcing the valve disk on its seat has been rocked so far that a shoulder 31 formed thereon engages the lug 319 at its side.

If now the stem 311 is further rotated in the direction of the arrow y shown in Fig. 13, the cam 318 rocks the valve disk 307 into the position shown in Fig. 14 and into engagement with an abutment 32 provided on the inner wall of the valve casing, the position of the said abutment being shown in Fig. 11. Now the valve disk is in the position shown in Fig. 11 in dotted lines. By rotating the stem 311 the shoulder 25 of the cam 24 has been brought out of engagement with the lug 26 of the arm 27 which therefore was free to ride on the radial portion of the cam 24. After the valve disk has been rocked away from the seat the parts are in the positions shown in Figs. 14 and 15.

For closing the valve the stem 311 is rotated in the direction of the arrow Z shown in Figs. 14 and 15. Now the cam 318 releases the lug 319 of the disk 307, and the lug 26 of the lever 27 rides outward on the radial portion of the cam 24 thus carrying along the lever 27. The free end of the lever 27 engaging the lug 29 rocks the disk 307 into the position shown in Fig. 12. When further rotating the stem 311 the lever 27 is not rocked, because the lug 26 rides on the concentric part of the cam. But the cam 318 is further rocked in the direction of the arrow Z, and the disk 307 is gradually moved into closing position shown in Fig. 12 and on the valve seat 304.

By means of the mechanism described above the valve disk 307 is moved from closing position into the intermediate position shown in Fig. 12 and further into open position and out of the path of the fluid by merely operating the hand wheel 314, and by operating the hand wheel in the opposite direction the valve is again completely closed.

In Figs. 16 to 24 I have shown a modification in which two valve disks 407 and 407a and valve seats 404 and 404a are provided, both valve disks being adapted to be operated by the same stem 411. The disk 407 is provided with two ribs 419 and the disk 407a with a single rib 419a, the said ribs cooperating with cams 418 and 418a of the stem 411 for pressing the disks on their seats. The rib 419a is somewhat elliptical in cross-section, as is shown in Fig. 17, in order to reduce the resistance to the flow of the fluid through the valve. Near the margin of the disks 407 and 407a bails 417 and 417a are provided which embrace cams 415, 416, 415a and 416a. By means of the said cams the disks 407 and 407a are retracted from their seats 404 and 404a into the position shown in Fig. 16.

The disk 407 is provided with mechanism for rocking both disks 407 and 407a from the position shown in Fig. 16 into the position shown in Fig. 17 when further rotating the stem 411. The said mechanism is shown in Figs. 21 and 22, and it is similar in construction to corresponding parts shown in Figs. 11 to 15.

For rocking not only the disk 407 but also the disk 407a into the position shown in Fig. 17 the following mechanism is provided:

At their outer ends the bails 417 are provided with lugs 33 engaging in grooves 34 of the bails 417a. Similar lugs 33 are provided on the bails 417a and engage in grooves 34 of the bails 417. The said grooves are disposed in the bails so that with the disks in the closed or intermediate positions they are parallel to the direction of the movement of the disks 407 and 407a when the said disks are being unseated. Thus, when opening or closing the valve the parallel disks are first moved towards or away from each other, and when the disk 407 is rocked the disk 407a is rocked in the same direction, such rocking movement of the disk 407a being effected by the lugs 33 engaging the side walls of the grooves 34 and therefore carrying along the disk 407a.

The stem 411 is passed through the cover 35 of the valve casing 403, and to the outer end thereof a box 36 is secured, the rotary movement of which is transmitted to the stem 411. Within the box 36 a second box 37 is rotatably mounted, which is formed at its top with a tubular extension 38 mounted in a frame 39 secured to the cover 35. Through the tubular extension 38 a spindle 40 is passed into the box 36, and to the inner end of the said spindle a pinion 41 is secured which is in engagement with a pinion 42 forming a part of a reducing gearing 42, 43, 44 mounted within the box 37. The gear wheel 44 is in mesh with internal gear teeth 45 carried by the wall of the casing 36.

The outer end of the spindle 40 is formed with screw-threads 46 of small pitch having a hand wheel 414 screwing thereon. According to the direction of rotation of the said wheel the hub 48 screws inwardly or outwardly on the screw-threads 46 and into engagement with the upper face of the tubular extension 38 or a head 49 formed on the spindle 40.

On lugs 50 projecting upwardly from the frame 39 a bifurcated lever 51 is rockingly mounted which is acted upon by a spring 52 attached to the frame 39, the said spring tending to rock the lever 51 in the direction of the arrow X shown in Fig. 18 and tending to bring an abutment 53 provided at one end of the lever 51 into engagement with the hub 48 of the hand wheel 414. At its opposite end the lever 51 carries a lug 54 which is thrown by the action of the spring 52 into engagement with notches 55 and 55a provided respectively in the extension 38 and the frame 39, when the hub 48 has been screwed upwardly, as is shown in Fig. 19. Thus, in the position of the parts shown in Fig. 19 rotary movement of the box 37 may be prevented by means of the lug 54, the frame 39 being fixed to the lid 35 of the valve casing.

As is shown in Fig. 23 the engaging faces of the disks 407 and 407a and the seats 404 and 404a thereof are spherical, the center of the sphere being located on the longitudinal axis of the stem 411. Therefore the disks can be rocked away from the passage of the valve after being slightly unseated, and seating and unseating mechanism of a very small pitch may be used by means of which high power can be exerted, and which have self-locking property in any position of the valve disks. For convenience in the manufacture of the valve the said surfaces may be conical, as is indicated by the broken line 56, in which case the axis of the cones 56 coincides with the median line of the passage of the valve.

In Figs. 24 to 26 I have shown a modification of the construction of the bails 417 and 417a, the said bails being formed with recesses such as dovetailed recesses 57 by means of which they are secured to lugs made integral with the disks 407 and 407a. Thus the bails are connected to parts located close to the margins of the disks, which therefore are not made unelastic by providing the bails thereon. The bails 417 and 417a are formed with lugs 33 engaging in grooves 34 of the adjacent bail. As has been explained above, the said construction permits the bails 417 and 417a to be moved relatively to each other in the direction of the movement of the disks 407 and 407a when unseating the said disks, and further it permits one of the disks 407a to be carried along by the other disk 407 when rocking the same.

The operation of the valve is as follows:

For opening the valve the hand wheel 414 is rotated in a direction for being screwed on the screw-threaded end 46 outwardly and to the top end of the spindle 40. The hub 48 releases the lever 51 which therefore is rocked by the spring 52 into position for locking the casing 37 to the frame 39. Therefore, when further rotating the hand wheel 414 in the same direction the casing 37 remains stationary, and the rotary movement of the spindle 40 is transmitted through the intermediary of the gear wheels 41 to 44 to the toothed rim 45 thus slowly rotating the casing 36 and the stem 411. Through the intermediary of the cams 415, 416, 415a, 416a and the bails 417, 417a the disks 407 and 407a are unseated and brought into the intermediate position shown in Fig. 16. Upon further rotary movement of the hand wheel 414 the shoulders 31 of the cams 418 engage the side faces of the ribs 419 of the disk 407 and rock the same into the position shown in Fig. 17, the disk 407a being carried along in the manner described above by means of the lugs 33 of the bails 417, 417a.

By disposing two disks 407 and 407a which in the open position of the valve shown in Fig. 17 are located out of the path of the fluid and in a lateral recess of the valve casing 3 the fluid flowing through the valve casing is guided so that any loss of pressure by whirls or the like is prevented. The fluid can not expand within the valve, as is the case in valves now in use.

For closing the valve the hand wheel 414 is rotated in the opposite direction and into the position shown in Fig. 18. The hub 48 engages the lug 53 of the lever 51 thus rocking the lug 54 out of locking engagement with the notches 55, 55a. When further rotating the hand wheel the hub 48 engages the tubular extension 38 of the box 37 and it is coupled thereto by friction. Therefore the box 37 is carried along. Now the transmission gearing 41 to 44 is inoperative while closing the valve, because the box 37 directly carries along the box 36 by reason of the locking engagement of the gear wheel 44 and the teeth 45. Now the box 36 is rotated at the same speed as the hand wheel 414.

The reducing gearing being now inoperative the stem 411 is rotated at increased velocity, and by the said rotary movement the cam 24 is rocked thus returning the arm 27 into initial position, the said arm rocking the disk 407 from the position shown in Fig. 22 into the intermediate position shown in Fig. 21. The rocking movement of the disk 407 is transmitted to the disk 407a through the intermediary of the lugs 33, so that also the disk 407a is brought into the intermediate position shown in Fig. 16.

When further rotating the stem 411 the cams 418 and 418a engage the ribs 419 and 419a and force the disks 407 and 407a on their seats 404 and 404a.

Owing to the provision of the gearing for opening and closing the valve, operation of a single hand wheel is sufficient for slowly opening the valve and rapidly closing the same, and special means for throwing the transmission gearing into and out of operation are dispensed with. By providing two disks 407 and 407a the valve can be used for example in conduits in which the fluid may flow in either direction.

By constructing the ribs 419 and 419a with elliptical cross-sections the resistance opposed by the said ribs to the flow of the fluid is reduced to a minimum.

In my improved construction the wear of the stuffing box and the packing medium contained therein is reduced to a minimum, so that leakage is prevented even if the fluid is under high pressure. An important feature of the invention consists in that for opening and closing the valve a single rotary movement of the valve stem is needed. In case of danger, for example if the conduit is broken, the valve can be closed within a minimum of time. Since the whole operation is performed exclusively by rotary movement of the valve stem the height of the valve construction is small. By disposing the cams for operating the valve disks freely within their bails the friction of the said parts when unseating the valve disk is small.

An important feature of the invention is the mechanism for rocking the valve disk or disks out of the path of the fluid and for returning the same into closing position. The operation of opening the valve, rocking the valve disk out of the path of the fluid and closing the valve is performed by the same mechanism.

The flow of the fluid is not interfered with by the valve disks, and the valve can be used in conduits in which the fluid flows in one or the other direction.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. A valve, comprising a valve casing, a valve closing member, a stem connected with said closing member for moving the same into and out of closing position and mounted in said valve casing for being rotatable and non-shiftable, operating means for said stem including a reducing gearing, and means operative when closing the valve for throwing said reducing gearing out of operation.

2. A valve, comprising a valve casing, a valve closing member, a stem connected with said closing member for moving the same into and out of closing position and mounted in said valve casing for being rotatable and non-shiftable, operating means for said stem including a reducing gearing, and means operative when opening and closing the valve for coupling and uncoupling said reducing gearing with the stem and its operating mechanism.

3. A valve, comprising a valve casing, a valve closing member, a stem connected with said closing member for moving the same into and out of closing position and rotatably mounted in said valve casing and held against axial movement therein, operating means for said stem to rapidly actuate said closing member, a reducing worm gearing included in said operating means for slowly actuating said closing member, and means for throwing said worm gearing out of operation to permit said rapid actuation of said closing member.

4. A valve, comprising a valve casing, a valve closing member, a stem connected with said closing member for moving the same into and out of closing position and mounted in said valve casing for being rotatable and non-shiftable, a spindle disposed coaxially of said stem and provided with operating means, a reducing gearing intermediate said spindle and stem, and means operative when rotating said spindle in a direction for opening or closing the valve for throwing the reducing gearing respectively into and out of operation.

5. A valve, comprising a valve casing, a valve closing member, a stem connected with said closing member for moving the same into and out of closing position and mounted in said valve casing for being rotatable and non-shiftable, a spindle disposed coaxially of said stem and provided with operating means, a reducing gearing intermediate said spindle and stem, and means automatically controlled by the movement of said operating means for throwing the reducing gearing out of and into operation.

6. A valve, comprising a valve casing, a valve disk, a rotary stem, means on said stem and disk for unseating said valve disk, successively at different points of its periphery a lug on said valve disk, and a cam on said stem adapted after unseating the valve disk to engage said lug for rocking the disk away from its seat.

7. A valve, comprising a valve casing, a valve disk, a rotary stem, means on said stem and disk for unseating said valve disc, a lug on said valve disk, and cams on said stem one adapted after unseating the valve disk to engage said lug for rocking the disk away from its seat and the other adapted to return said valve disk into position in front of its seat.

8. A valve, comprising a valve casing, a valve disk, a rotary stem, means on said stem and disk for unseating said valve disc, a lug on said valve disk, and a cam on said stem having a shoulder and adapted after unseating the valve disk to engage said lug with its shoulder for rocking the disk away from its seat, and having its cam face cooperating with said lug for pressing said disk on its seat.

9. A valve, comprising a casing having an intake passage and an outlet passage, valve disks one for each of said passages and movable in opposite directions for opening and closing said passages, cooperating interlocking members on said disks formed respectively with grooves located in the direction of seating and unseating said valves and lugs engaging in said grooves, and means for seating and unseating said valve disks and for rocking the same into and out of the path of the fluid flowing through said casing.

In testimony whereof, I have signed this specification.

KURT KARNATH.